Oct. 29, 1968        HANS-WERNER SELBACH        3,407,438
PLASTICIZING SYSTEM FOR PLASTIC MATERIALS
Filed June 27, 1966                2 Sheets-Sheet 1
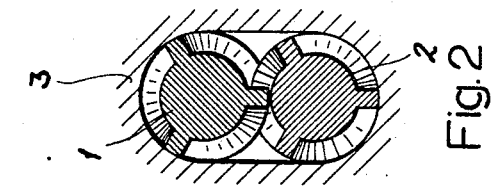
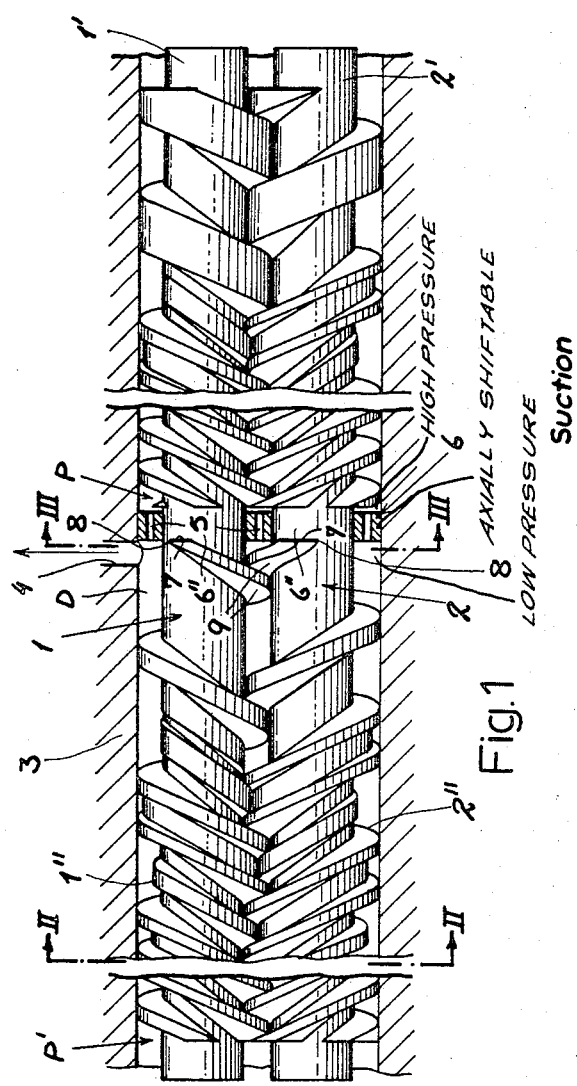
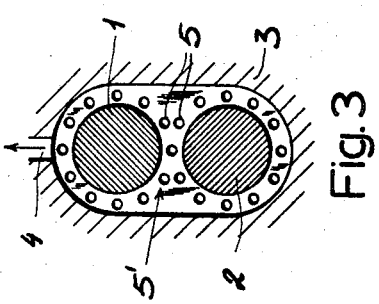
Hans-Werner Selbach
INVENTOR.
BY Karl J. Ross
Attorney

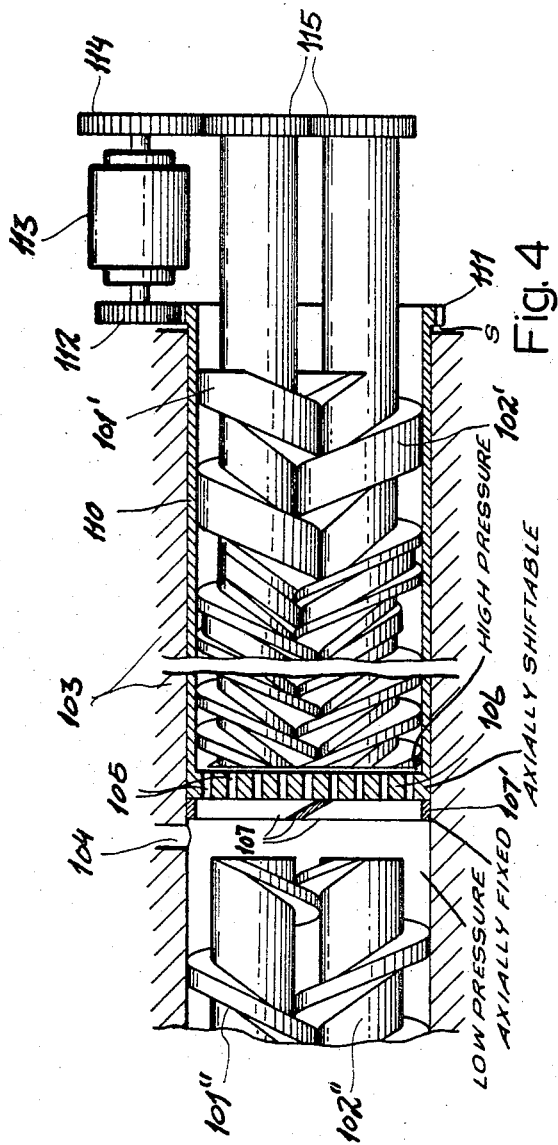
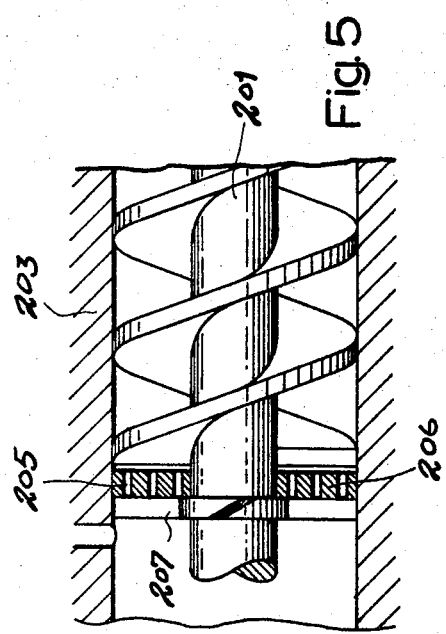

United States Patent Office 3,407,438
Patented Oct. 29, 1968

3,407,438
PLASTICIZING SYSTEM FOR PLASTIC MATERIALS
Hans-Werner Selbach, Bad Oeynhausen, Germany, assignor to Firma Rolf Kestermann Maschinenfabrik, a corporation of Germany
Filed June 27, 1966, Ser. No. 560,553
Claims priority, application Germany, June 26, 1965, K 56,482
7 Claims. (Cl. 18—12)

ABSTRACT OF THE DISCLOSURE

A plasticizing system for thermoplastic synthetic resins in extrusion or injection-molding presses wherein a perforated disk is disposed in an intermediate location along a plasticizing worm which forces the thermoplastic material through the perforated disk and axially shifts the latter against a blade on the downstream decompression side of the disk at which the blade comminutes the strands of material extruded through the disk, the decompression chamber being evacuated to degas the comminuted product in the decompression chamber.

My present invention relates to a screw-type or worm plasticizer and masticator for synthetic-resin materials and especially to an improved device of this character for use with extrusion or injection-molding apparatus.

In my U.S. Patent No. 3,104,420 issued Sept. 24, 1963, I have described a masticator for plasticizing synthetic-resin materials and including one or more intermeshing and generally parallel worms adapted to squeeze the plastic material between the lands or threads and grooves of the mating worms while imparting thereto a compression serving to fluidify and homogenize the plastic mass. It has been recognized that when worm-type plasticizers for extrusion presses and other molding machines requiring a homogenized liquid flow of the resin are used, the development of gases upon plasticization of the resinous material is disadvantageous. It has been proposed heretofore, therefore, to provide means in the plasticizing device for removing gases generated upon mastication of the plastic materials by evacuating the plasticization chamber. In general, such earlier systems have comprised, along the masticating screw or screws, a pressure zone followed by an evacuated expansion zone with means for drawing off the gaseous components through the wall of the plasticizing chamber in which the screws are received. Such arrangements have been found to be somewhat useful with plasticizing devices for polyvinyl chlorides and like materials in which the gas evolution upon mastication is a significant problem, although they do not operate in an optimal manner. Personnel working with such arrangements have encountered many difficulties with respect to the nonuniformity of the flow of the plastic material through the system, the unpredictable characteristics of the transfer of the plastic material from the pressure zone to the evacuated or depressurization zone, and the inability of the worms leading away from the expansion zone to uniformly advance the degasified mass, as well as with respect to the character of the degasification. As to the latter point, it may be stated that the plastic materials advanced by the screws after they have emerged from a degasification stage frequently are found to have gaseous inclusions and to contain decomposition products which are highly undesirable. The conventional degasification means in plasticising devices of the character described have, consequently, proved to be highly ineffective.

It is, therefore, the principal object of the present invention to provide a worm or screw-type plasticizing device for the mastication of synthetic-resin materials and the removal from the mass thereof of gaseous components released during plasticization in which the disadvantages of earlier systems are avoided and an optimal rate of mastication can be obtained.

A further object of this invention is to provide an improved plasticizing device of the character described from which plastic materials such as polyvinyl chlorides are obtained in a homogeneous fluid condition and free from gaseous inclusions and decomposition products.

I have discovered that these objects can be obtained when the transition between a compression zone, formed by intermeshing screw means with the threads or lands arranged to masticate and compact the resin material, and an expansion zone having a greater flow cross-section for the synthetic-resin material is formed by a plate received in the cylindrical masticator bore and lying in a plane perpendicular to the axis of the screws and surrounding these screws while having respective arrays of passages for the transfer of the material to be degasified to a second set of worms for its further advance. The invention resides in providing, along the forward face of this plate or disk, in the direction of flow of the plasticized material, one or more cutting edges preferably coupled with the respective worms and adapted to sweep the plate and sever the strands of plastic material as they are extruded through the bores. Upon being forced through the bores, the material is exposed to the low pressure in the expansion zone and readily releases any entrapptd gases which may be evacuated through a wall of the masticator bore forwardly of this perforated plate. The intense comminution of the degassed plastic material at the forward surface of the plate and its subsequent engagement and remastication by the forward worms has been found to result in a substantially complete removal of gases and the final product is found to be substantially free from any entrapped gases or gaseous components and devoid of any decomposition products.

It appears that the present system, as described above, derives its surprising effectiveness from the increased surface area exposed to the reduced pressure and permitting gas passage into the plenum surrounding the particles formed by the cooperating action of the cutting edges and the disk. This enlargement of the surface area is a consequence of the granulating action which also permits a more homogeneous subsequent mastication of the plastic mass. As indicated earlier, the granulation step is the result of sweeping one or more cutting edges across the annular arrays of apertures of the disk and indeed the sweeping action can be carried out either by rotating the blade means while holding the disk stationary, rotating the disk while holding the blades stationary, or relatively rotating the disk and the blades. Moreover, the granulating means, including the blade or blades and the perforated disk, prevent excessive plastification of the mass. Thus, the mass passing through the apertures of the disk may be substantially homogeneous particles in a preliminary state of plastification, although the invention is equally applicable to arrangements in which the first mastication zone substantially completely plastifies or fluidifies the mass whereby the plastic mass forms droplets of relatively large surface area upon emergence into the depressurization zone.

According to a further feature of this invention, the plastification device is provided with a fixed perforated disk while the blade means is carried by the shaft of the worm adjacent an axial region thereof passing through the disk and free from threads or lands. The arrangement may be used with a single-worm system. For double-worm masticators and plasticizing devices, the perforated disk can be rotatably mounted upon the shafts or other means for driving the disk. In each case, it is advantageous to mount the disk with freedom of axial movement so that it can be urged against the blade means by the pressure behind it to effect a clean shearing action. The number of blades, their spacing and the relative rotary speeds of the disk and the blade means can, of course, be selected in accordance with the desired degree of granulation and the desired particle size of the mass formed in the expansion chamber. It has been found advantageous in substantially all cases to constitute as the blade means the rearmost edges of the threads or lands of the subsequent plasticizing and conveying worms. In this system, of course, no additional blade means need be provided.

The above and other objects, features and advantages of the present invention will become more readily apparent from the following description, reference being made to the accompanying drawing in which:

FIG. 1 is an axial cross-sectional view of a plasticizing and mastication arrangement, partly shown in diagrammatic form, adapted for use with an extrusion head or the like and provided with the degasification means of the present invention.

FIGS. 2 and 3 are fragmentary cross-sectional views taken generally along the lines II—II and III—III of FIG. 1, respectively;

FIG. 4 is a fragmentary, axial cross-sectional view of a modified arrangement for the plastification and displacement of a plastic mass in accordance with this invention; and FIG. 5 is another fragmentary axial cross-sectional view illustrating a further embodiment of the invention.

In FIGS. 1–3, I show a double-worm plasticizing device for an extrusion press which is designed to convert a pulverulent thermoplastic mass, e.g. of polyvinyl chloride, into a fluid homogeneous stream extrudable through a head or die (not shown) disposed forwardly of the worms 1 and 2. The worms 1 and 2 are received in a cylindrical mastication-chamber housing 3 which may be provided with heating means as described in the aforementioned patent, the worms 1 and 2 being intermeshed in the manner also set forth and illustrated in the patent. In general, therefore, it may be said that the worms 1 and 2 are axially subdivided into an upstream or first plastification section 1', 2' and a downstream or second section 1", 2" and in each section form a progressively decreasing flow cross-section for the synthetic-resin material. Consequently, as the synthetic-resin material is advanced from right to left (FIG. 1) along the upstream portions 1', 2' of the worms, the synthetic-resin material is squeezed between the interfitting lands and grooves of the worms and is thoroughly masticated, mixed, homogenized and at least partially fluidified by the rotary action of the worms 1 and 2. Forwardly of the compression zone P of the upstream portions of the worms 1', 2', I provide a decompression zone D in the chamber 3 for degasification, this zone D being connected via one or more bores 4 in the wall of the housing 3 to a reduced-pressure source such as a vacuum pump. The flow cross-section formed by the worm portions 1" and 2" in the region of the degasification zone D is thus substantially greater than the flow cross-section for the plastic material at the pressure zone and, in a similar manner, the flow cross-section decreases toward the pressure zone P' of the downstream worm portions 1" and 2". Thus, the degasified mass is again subjected to thorough mastication, mixing, homogenization and plasticization until it is discharged to an injection-molding press or through the extrusion head.

In accordance with the principles of the present invention, a perforated disk 6 is provided between the pressure zone P and the decompression zone D and is angularly fixed in the housing 3 while being provide with perforations 5 extending in the direction of flow of the plastic mass. A cutting means is generally represented at 7 for sweeping the forward face 6' of the disk 5 across the annular arrays 5' of perforations 5, thereby severing the strands of plastic material extruded through these perforations. Just adjacent this face of the disk 6, the bores 4 are provided to evacuate the decompression chamber D. From FIGS. 1–3, it can be seen that the worms 1 and 2 are rotatably journaled in the disk 6 at zones 6" free from conveyor and masticating threads while the disk is nonrotatable. The cutting means 7 are here carried by the worms 1 and 2 and are formed by cutting edges 8 of the rearmost portion of the sections 9 of the conveyor worms or threads 1", 2" in the region of the decompression chamber. Since the pressure behind disk 6 is greater than that in the region of the blade 7 and the smooth zones 6" and the smooth wall of the bore of housing 3 permit axial movement of the disk along the worms, the pressure differential urges the disk against the blades.

In the modification of FIG. 4, the worms 101' and 102' are driven independently of the downstream worms 101" and 102" in the housing 103 while the disk 106 is rotatable. For this purpose, the disk 106 is carried by a sleeve 110 whose ring gear 111 meshes with a pinion gear 112 of a motor 113. The other pinion gear 114 of this motor, in turn, meshes with the gears 115 driving the worm portions 101' and 102'. In this embodiment, the blade means is formed by one or more blades 107 diametrically spanning the chamber 103 and axially and angularly fixed in a support ring 107' of the decompression chamber from which the gases are led by bores 104. The disk 106 is formed with perforations 105 through which strands of the plastic material are extruded for granulation by the blades 107. A play s is provided to permit axial movement of the disk 106 under the pressure differential of the plastic material thereacross and to apply the disk against the blade with such pressure.

In the system of FIG. 5, the single worm 201 carries the disk 206 whose perforations are shown at 205 and which is journaled in the housing 203 for co-operation with the fixed blade means 207 which sever the strands of plastic material extruded through the perforations 205. It will be understood that the downstream threads can also be provided upon the worm 201 and that, in a modification of this system, the disk 206 can be driven as illustrated in FIG. 4 and thus rotated relatively to the worm 201 or synchronously therewith.

In all of the embodiments, the disk may be keyed to its drive means or retained within the housing with freedom of the axial movement so that it is biased by the pressure of the synthetic-resin material against the blade means co-operating therewith. As set forth in the above-identified patent, the worms of each portion of the masticating and conveyor screw increase in pitch and decrease in depth toward the compression side (i.e. in the direction of advance of material). In addition, each worm has a thread rising radially in this direction and received in a complementary groove of the mating thread.

The invention described and illustrated is believed to admit of many modifications within the ability of persons skilled in the art, all such modifications being considered within the spirit and scope of the appended claims.

I claim:

1. A masticating device for plasticizing a synthetic-resin material comprising housing means forming an elongated plasticizing chamber, plasticizing and conveying worm means rotatable in said chamber and extending therealong for advancing the material along said worm means while plasticizing same, said worm means having an upstream portion of progressively decreasing flow cross-section for said material and a downstream portion of progressively decreasing flow cross-section, said portions defining with said chamber in succession a compression zone and a decompression zone along said chamber successively traversed by said material, a perforated disk member in said chamber between said zones and provided with a multiplicity of perforations extending in the direction of flow of said material whereby said material is extruded through said perforations from said compression zone into said decompression zone, at least one blade member adapted to sweep along the downstream face of said disk for severing the material forced through said perforations and granulating the material in said decompression zone, means mounting said disk member with axial mobility in said chamber whereby the pressure of said material in said compression chamber urges said disk member against said blade member, said housing means being provided with at least one passage communicating with said decompression zone proximal to said disk for connecting said decompression zone to a reduced-pressure source whereby said material is degassed upon emergence into said decompression zone, and means for rotating at least one of said members relative to the other of said members.

2. A device as defined in claim 1 wherein said disk member is angularly fixed but axially movable in said chamber and said blade member is carried by said worm means.

3. A device as defined in claim 2 wherein said worm means extends through both said zones and has a thread-free portion passing through said disk member.

4. A device as defined in claim 3 wherein said worm means includes at least two conveyor screws with mating threads including upstream thread portions and downstream thread portions, said blade member being constituted by the upstream end of the downstream thread portion of each screw.

5. A device as defined in claim 1 wherein said blade member is fixed in said chamber.

6. A device as defined in claim 5 wherein said blade member is journaled for rotation in said chamber and is axially movable therein, the last-mentioned means driving said blade member.

7. A device as defined in claim 1 wherein said worm means extends through both said zones and is formed with a respective thread portion of progressively decreasing pitch and thread height upstream and downstream of said disk member.

References Cited

UNITED STATES PATENTS

| | | |
|---|---|---|
| 1,283,947 | 11/1918 | Steinle. |
| 1,320,128 | 10/1919 | Felix. |
| 2,712,799 | 7/1955 | Braibanti et al. |
| 2,817,876 | 12/1957 | Gandelli et al. |
| 3,114,171 | 12/1963 | Colombo. |
| 3,146,493 | 9/1964 | Steinle et al. |
| 3,151,192 | 9/1964 | Jacobs et al. |
| 3,164,563 | 1/1965 | Maxwell et al. |

FOREIGN PATENTS

| | | |
|---|---|---|
| 558,537 | 3/1957 | Italy. |

WILLIAM J. STEPHENSON, *Primary Examiner.*